G. COPELAND.
Ore Separators.
No. 5,944. Reissued June 30, 1874.
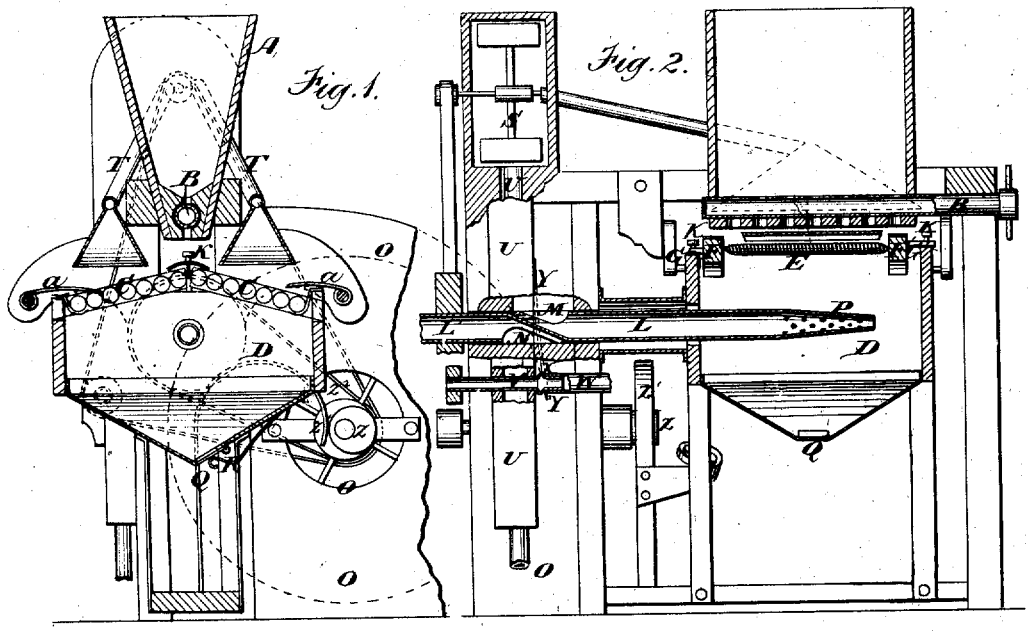
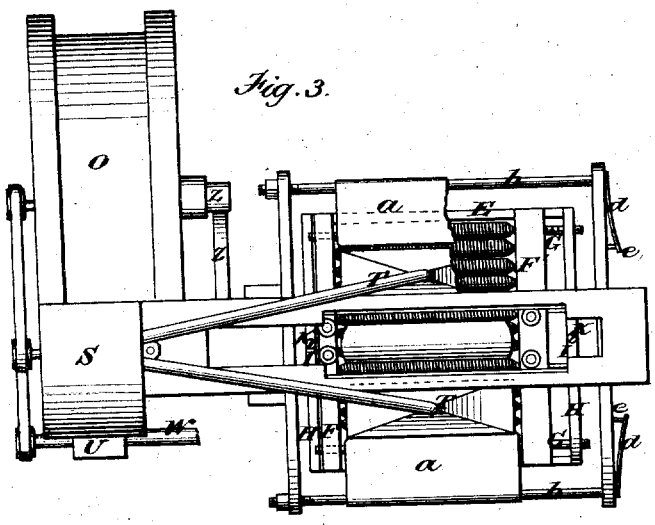
Witnesses.
C. F. Brown
M. Church
Inventor
Geo. Copeland
by his Attys.
Hill & Ellsworth

UNITED STATES PATENT OFFICE.

GEORGE COPELAND, OF DENVER, COLORADO TERRITORY, ASSIGNOR TO CHARLES E. WHITMORE.

IMPROVEMENT IN ORE-SEPARATORS.

Specification forming part of Letters Patent No. 103,574, dated May 31, 1870; reissue No. 5,944, dated June 30, 1874; application filed June 25, 1874.

*To all whom it may concern:*

Be it known that I, GEORGE COPELAND, of Denver, in the county of Arapahoe and Territory of Colorado, have invented certain new and useful Improvements in Separators; and I do hereby declare the following to be a full, clear, and exact description of the same, reference being had to the accompanying drawings forming part of this specification, in which—

Figure 1 is a transverse sectional elevation of my improved separator. Fig. 2 is a sectional elevation, taken at right angles to the plane of Fig. 1; and Fig. 3 is a top-plan view, partly in section.

Similar letters of reference indicate the same parts in the several figures of the drawings.

This invention relates to that class of separators employed for separating dry pulverized or granular substances, according to the relative weight and size of their particles, by the action of a sieve or screen, combined with a current or currents of air, and has for its object to effect the more perfect separation of such substances.

The invention consists, first, in the improved process of separating the different particles according to their size and weight; secondly, in the following improvements in mechanism adapted for the purpose of such separation, viz: First, combining a sieve or screen with an air-blast beneath and an air suction or exhaust above it; second, combining an inclined sieve or screen with an air-blast beneath and an air suction or exhaust above it; third, combining a movable sieve or screen with an air-blast beneath and an air suction or exhaust above it; fourth, combining a longitudinally reciprocating or vibrating sieve or screen with an air-blast beneath and an air suction or exhaust above it; fifth, combining a vertically-adjustable sieve or screen with an air-blast beneath it and an air suction or exhaust above it, or with either of them; sixth, combining a sieve or screen, having its inclination adjustable, with an air-blast beneath it and an air-suction or exhaust above it, or with either of them; seventh, arranging a sieve or screen, an air exhaust or suction above it, and an air-blast beneath it, in such manner that the suction shall assist the blast in creating an upward current through or from the sieve; eighth, combining, in a separator, a sieve or screen, through which a blast passes in one direction, while the finer and heavier substances to be separated pass in the other, with an auxiliary pipe, with jets from an independent fan-blower; ninth, combining a movable sieve or screen with an air suction or exhaust above it, and mechanism for clearing the under side of the screen; tenth, combining with a sieve or screen an air-pipe beneath it, to deliver the air in thin currents or jets against the under side of the screen for the purpose of clearing the meshes thereof, and lifting into the air the light particles thereon; eleventh, combining with a sieve or screen a rotary air-blast pipe beneath it, the fine air currents or jets from which impinge against the under side of the sieve; twelfth, combining with a sieve or screen a traveling air-blast beneath it, and impinging against its under side; thirteenth, dividing the air-blast so as to cause a portion of it to act upon one part of the vibrating screen, while another portion is operating upon a different part of the same screen; fourteenth, combining an intermittent air-blast under a sieve or screen with an air-suction or exhaust above it; fifteenth, dividing the sieve or screen into sections, and causing the several sections to be cleaned by blasts from the same fan; sixteenth, the combination of one or more covering-chambers, a suction-fan, and one or more conducting-pipes, with a vibrating or reciprocating sieve or screen; seventeenth, the combination of one or more covering-chambers, a suction-fan, and one or more conducting-pipes with a movable screen having an air-blast beneath it; eighteen, the combination of a receiving-hopper having a sieve or screen at the top, with an air-blast pipe underneath the sieve, and a blower to deliver the air in thin currents or jets; nineteenth, an adjustable feed extending substantially the whole width of the sieve or screen, or at right angles to the line of its movement; twentieth, regulating the movement and discharge of the material upon the sieve or screen by varying the inclination of the latter; twenty-first, a sieve or screen capable of being rendered coarser or finer by the adjustment of its reticulations; twenty-second, arranging the air-blast of several separating-machines to be operated by a single fan.

In the accompanying drawings, which show one form of machine for carrying out my invention, A is a hopper, into which the substance or material to be separated or treated is conveyed by any suitable means. It is provided with numerous holes along the bottom for the delivery of the material, and a rotary perforated valve, B, for regulating or stopping the discharge. C is a sieve placed under the hopper A and over another hopper, D, and in this instance is arranged to shed each way from the line of the delivery-orifices of the hopper above. The material is fed from this hopper in a thin sheet or series of small streams across the width of the sieve, and in a line at right angles or nearly so to the line of its reciprocations or vibrations. The material is, therefore, spread evenly over and across the receiving portion of the sieve, and its flow is regulated or stopped by the adjustable valve B.

The sieve shown in this example of my invention is formed of spiral-wire coils or springs E, stretched from the end blocks F F¹, parallel with each other, forming meshes or reticulations, which may be varied for finer or coarser material by adjusting the end blocks to or from each other through the medium of the screw rods G G′, by which they are connected, and by which they are supported on the bars H of the frame. The end blocks are jointed at the center, and the screw-rods G′ thereat rest at the ends on plates I on the top of the bars H, having adjusting-screws K, by which they may be raised or lowered to vary the angle of the shed or inclination, for the purpose of regulating the movement and discharge of the material upon such sieve. Other sieves, however, may be used instead of such as I have described.

The sieve has a reciprocating or shaking motion imparted to it by an eccentric-wheel, Z, on the shaft of a fan, O, acting on a spring, Z¹, connected to the sieve supports, which are arranged in any suitable way for vibration. L is a two-way-revolving blast-pipe, receiving air alternately through the orifices M N from a fan, O, and projecting into the hopper D, where it has a perforated nozzle, P, through which the air is delivered in gusts and jets among the particles of heavier matter, and acting on the lighter and coarser matters on the sieve to toss them up and separate them from the heavier. S is a suction or exhaust fan attached to the top of the machine, and having two covering-chambers or funnel-mouthed pipes arranged above the sieves to take up the fine light dust or particles and convey them away through the pipe U to a receptacle.

As the sieve vibrates or reciprocates the heavy and valuable substances fall through it into the hopper D. The coarser and lighter particles are held in suspension over the sieve by means of the ascending air-currents, and float down over the sieve to the tail thereof, where they are discharged. The light fine dust and impurities, rising above the light coarse particles, are drawn off by the suction-fan and conveyed away to a receptacle. By this means the pure and valuable materials fall through the sieve, the coarse light particles are discharged at the end, and the light fine particles are drawn up and carried off by the suction or exhaust fan.

An upward current of air has a tendency to cause particles of matter to adhere to the under side of the sieve, and to counteract this the under side of the sieve should be swept by some force moving laterally, to clear it from such particles. The perforated nozzle of the blast-pipe projects the air in thin currents or jets against the under side of the sieve at almost every angle, and the rotation or oscillation of the pipe causes these fine currents or jets to travel along the under side of the sieve and brush off any particles that may have attached themselves thereto. This action of the air currents or jets is facilitated or increased by the constant changing of the angle at which they strike the sieve, by the traveling movement of the sieve itself, and by the vibrations or percussion of the sieve, due to the action of the driving cam and the spring. The air-blast has the further function of removing any particles that may become lodged in the meshes of the sieve. The suction assists the blast in creating an upward current through or from the sieve.

The sieve shown in the drawings is divided into sections, which are cleaned by the fan-blast, and while one portion of the blast is acting upon one part of the sieve another portion of it acts upon a different part of the sieve. The vertical adjustment of the sieve adapts it to operate nearer to, or farther from, the suction and blast, or at any desired point between the two.

The hopper D is closed, except at the top, and is provided with an escape-valve, Q, at the bottom, held closed by a spring, R, which will resist the force of the blast, but will yield under the weight of an accumulation of the treated substance sufficiently to let it escape from time to time and prevent the hopper from filling. The part L′ of the air-pipe is intended to conduct the air admitted through the passage N to another similar hopper at the other side of the blast fan, to which like attachments are connected, constituting a double-acting machine, whereby the continuous blast from the fan O is delivered to each set in alternate gusts. The pipe U may receive jets of water from a revolving perforated pipe, V, to which a hose-pipe, W, is jointed at X, and held in contact by a spring, Y, or other suitable means. These water-jets may be mixed with the dust drawn up by the suction-fan, to prevent it from being carried away in the air. The air-blast tube L L′ is operated by a belt, Z², from the fan-shaft, working over a pulley thereon; and the suction and water-jet tube may also be operated by belts from the same shaft, or they may be operated in any approved way.

*a* are skimmers, arranged at the lower edges of the sieves and lapping over the upper surfaces a short distance. They are arranged on oscillating shafts *b*, having spring-arms *d* and holding-pins *e*, by which they may be raised or lowered and held in any desired position when it is necessary to skim off the coarse and light particles of matter which are floated down over the sieve and above the heavier particles by the action of the air and the sieves.

The feed-hopper and valve B may be dispensed with and the substance fed directly to the sieves by hand or other means, as preferred.

Having thus described my invention, what I claim is—

1. The process of separating pulverized or granular substances by spreading them onto a suitable bed, blowing air up through the bed to lift and lighten up the substance thereon, and employing a suction or exhaust above the bed to carry off the fine light particles or impurities, substantially as described.

2. In a separating-machine, a sieve or screen in combination with an air-blast beneath and an air suction or exhaust above it.

3. In a separating-machine, an inclined sieve or screen combined with an air-blast beneath and an air suction or exhaust above it.

4. In a separating-machine, a movable sieve or screen combined with an air-blast beneath and an air suction or exhaust above it.

5. In a separating-machine, a longitudinally-reciprocating or vibrating sieve or screen combined with an air-blast beneath and an air suction or exhaust above it.

6. In a separating-machine, a vertically-adjustable sieve or screen combined with an air-blast beneath and an air suction or exhaust above it.

7. In a separating-machine, a sieve or screen, having its inclination adjustable, combined with an air-blast beneath it.

8. In a separating-machine, a sieve or screen, having its inclination adjustable, combined with an air suction or exhaust above it.

9. In a separating-machine, a sieve or screen, having its inclination adjustable, combined with an air-blast beneath and an air suction or exhaust above it.

10. In a separating-machine, a sieve or screen, an air exhaust or suction above it, and an air-blast beneath it, arranged and operated in such manner that the suction shall assist the blast in creating an upward current through or from the sieve.

11. In a separating-machine, a sieve or screen through which a blast passes in one direction while the finer and heavier substances to be separated pass in the other, combined with an auxiliary pipe with jets from an independent fan-blower.

12. In a separating-machine, a movable sieve or screen with an air suction or exhaust above it and mechanism for cleaning the under side of the screen.

13. In a separating-machine, a sieve or screen combined with an air-pipe beneath it, to deliver the air in thin currents or jets against the under side of the screen, for the purpose of clearing the meshes thereof and lifting into the air the light particles thereon.

14. In a separating-machine, a sieve or screen combined with a rotary air-blast pipe beneath it, the fine air currents or jets from which impinge against the under side of the sieve.

15. In a separating-machine, a sieve or screen combined with an air-blast beneath it, the air current or currents from which impinge against and travel along the under surface of the sieve.

16. In a separating-machine, having a vibrating sieve or screen, a number of air currents or jets divided so that a portion of them acts upon one part of the screen while another portion acts upon a different part of the same screen.

17. In a separating-machine having a sieve or screen, an intermittent air-blast under the sieve combined with an air suction or exhaust above it.

18. In a separating-machine, a sieve or screen divided into sections cleaned by blasts of air from the same fan.

19. In a separating-machine, a vibrating or reciprocating sieve or screen combined with one or more covering-chambers, a suction or exhaust fan, and one or more conducting-pipes, arranged to receive the light fine particles directly over the sieve.

20. In a separating-machine, the combination of one or more covering-chambers with a suction-fan, one or more conducting-pipes, and a movable screen having an air-blast beneath it.

21. In a separating-machine, the combination of a receiving-hopper having a sieve or screen at the top, with an air-blast pipe underneath the sieve constructed to deliver the air in thin currents or jets.

22. In a separating-machine, an adjustable feed to deliver the material substantially the whole width of the reciprocating or vibrating sieve.

23. In a separating-machine, a sieve or screen capable of being rendered coarser or finer by the adjustment of its reticulations.

24. The combination of a single fan with the blast-pipe, of several separating-machines, substantially as described.

GEO. COPELAND.

Witnesses:
H. R. WHITMORE,
JNO. B. CHURCH.